United States Patent
Sundaram et al.

(10) Patent No.: US 11,650,575 B2
(45) Date of Patent: May 16, 2023

(54) SYSTEM AND A METHOD FOR CONTROL AND AUTOMATION SERVICE

(75) Inventors: Senthil Kumar Sundaram, Bangalore (IN); Sunderam Sankaran, Bangalore (IN); Narayanan Venkateswaran, Bangalore (IN); Georg Guttermuth, Heidelberg (DE)

(73) Assignee: ABB RESEARCH LTD., Zurich (CH)

( * ) Notice: Subject to any disclaimer, the term of this patent is extended or adjusted under 35 U.S.C. 154(b) by 1203 days.

(21) Appl. No.: 13/110,172

(22) Filed: May 18, 2011

(65) Prior Publication Data

US 2011/0257766 A1    Oct. 20, 2011

Related U.S. Application Data

(63) Continuation of application No. PCT/IB2008/003268, filed on Nov. 24, 2008.

(51) Int. Cl.
*G05B 19/418* (2006.01)

(52) U.S. Cl.
CPC .......... *G05B 19/4185* (2013.01); *Y02P 90/02* (2015.11); *Y02P 90/80* (2015.11)

(58) Field of Classification Search
CPC ..... G06F 9/455; G06F 9/45533; G06F 1/1692
USPC .......................................................... 700/9, 7
See application file for complete search history.

(56) References Cited

U.S. PATENT DOCUMENTS

| | | | |
|---|---|---|---|
| 5,909,368 A * | 6/1999 | Nixon ................ | G05B 19/0421 700/131 |
| 6,023,507 A * | 2/2000 | Wookey .............. | G06F 11/2294 380/285 |
| 6,594,799 B1 | 7/2003 | Robertson et al. | |
| 6,601,086 B1 | 7/2003 | Howard et al. | |
| 6,625,274 B1 * | 9/2003 | Hoffpauir ............... | H04L 29/06 379/201.12 |
| 6,662,221 B1 * | 12/2003 | Gonda ................ | H04L 12/4641 370/254 |
| 6,680,906 B1 * | 1/2004 | Nguyen ........................ | 370/229 |

(Continued)

FOREIGN PATENT DOCUMENTS

| | | |
|---|---|---|
| CN | 1981556 A | 6/2007 |
| EP | 1 416 400 A2 | 5/2004 |

(Continued)

OTHER PUBLICATIONS

Leitner et al, OPC UA Service Oriented Architecture for Industrial Applications, 2006, pp. 6.*

(Continued)

*Primary Examiner* — Rocio Del Mar Perez-Velez
*Assistant Examiner* — Olvin Lopez Alvarez
(74) *Attorney, Agent, or Firm* — Leydig, Voit & Mayer, Ltd.

(57) ABSTRACT

The present disclosure relates to exemplary systems for providing control and expert services over a communication network by specialized service providers to various kinds of automation needs and methods thereof. The arrangement allows sharing of automated control system components among one or multiple users. Methods to configure and use control and automation service are also described. Exemplary systems for control and automation service as disclosed herein can have greater flexibility and simplicity from the plant user perspective.

19 Claims, 6 Drawing Sheets

System for control and automation service (according to the main embodiment of the present invention)

(56) References Cited

U.S. PATENT DOCUMENTS

| | | | |
|---|---|---|---|
| 7,225,037 B2* | 5/2007 | Shani | G05B 19/056 700/18 |
| 7,233,830 B1* | 6/2007 | Callaghan et al. | 700/9 |
| 7,249,039 B2* | 7/2007 | Yoshioka | G06Q 30/02 342/457 |
| 7,499,762 B2* | 3/2009 | Khorramshahi | H04L 67/125 340/870.07 |
| 7,567,853 B2* | 7/2009 | Kreidler et al. | 700/169 |
| 7,684,876 B2* | 3/2010 | Grgic | 700/19 |
| 7,693,581 B2* | 4/2010 | Callaghan et al. | 700/9 |
| 8,032,899 B2* | 10/2011 | Archer et al. | 719/319 |
| 8,763,115 B2* | 6/2014 | Budko et al. | 726/22 |
| 8,875,097 B2* | 10/2014 | Dasch | G06F 9/4428 717/120 |
| 2001/0043617 A1* | 11/2001 | McKinnon | H04L 12/2801 370/477 |
| 2002/0021465 A1* | 2/2002 | Moore, Jr. | H04L 12/2803 398/72 |
| 2003/0014498 A1 | 1/2003 | Kreidler et al. | |
| 2003/0016411 A1* | 1/2003 | Zhou | H04Q 11/0062 398/5 |
| 2003/0139174 A1* | 7/2003 | Rao | H04L 29/06 455/418 |
| 2004/0003083 A1* | 1/2004 | Wookey | H04L 67/42 709/225 |
| 2004/0006620 A1 | 1/2004 | Howard et al. | |
| 2004/0052526 A1* | 3/2004 | Jones | H04J 14/0221 398/50 |
| 2004/0098391 A1 | 5/2004 | Robertson et al. | |
| 2004/0100684 A1* | 5/2004 | Jones | H01S 3/2383 359/337.11 |
| 2004/0128375 A1* | 7/2004 | Rockwell | G06Q 10/0875 709/223 |
| 2004/0158474 A1* | 8/2004 | Karschnia | G05B 19/4185 379/29.01 |
| 2004/0181573 A1* | 9/2004 | Cao | H04L 41/145 709/200 |
| 2004/0186603 A1* | 9/2004 | Sanford | G05B 23/0245 700/95 |
| 2004/0222904 A1* | 11/2004 | Ciolli | G08G 1/04 340/937 |
| 2005/0025180 A1* | 2/2005 | Curcio | H04L 12/5695 370/468 |
| 2005/0044169 A1* | 2/2005 | Arbeitman | G06F 11/0712 709/217 |
| 2005/0055429 A1 | 3/2005 | Abele et al. | |
| 2005/0071298 A1* | 3/2005 | Forman | G06Q 30/04 705/412 |
| 2005/0143131 A1* | 6/2005 | Gish | H04J 3/1617 455/561 |
| 2005/0165886 A1* | 7/2005 | Tuer | G08G 1/0962 709/203 |
| 2005/0222813 A1* | 10/2005 | Bjornson | G06Q 10/06 702/183 |
| 2005/0228863 A1* | 10/2005 | Palmeri | G06F 9/54 709/205 |
| 2005/0273652 A1* | 12/2005 | Okawa | G06F 9/505 714/10 |
| 2006/0010006 A1* | 1/2006 | Kreidler | G05B 19/4183 705/400 |
| 2006/0026296 A1* | 2/2006 | Nagaraj | H04L 47/10 709/233 |
| 2006/0070010 A1* | 3/2006 | Retlich | 715/798 |
| 2006/0111960 A1* | 5/2006 | Chess | G06Q 10/06 705/7.29 |
| 2006/0117295 A1* | 6/2006 | Wu | G05B 19/00 717/104 |
| 2006/0142882 A1 | 6/2006 | Heller et al. | |
| 2006/0168343 A1* | 7/2006 | Ma | H04W 52/383 709/245 |
| 2006/0221826 A1* | 10/2006 | Bedingfield | H04L 41/12 370/229 |
| 2006/0222008 A1* | 10/2006 | Aaron | H04L 41/5025 370/468 |
| 2006/0233108 A1* | 10/2006 | Krishnan | 370/235 |
| 2006/0234749 A1* | 10/2006 | Morrison | H04W 52/225 455/522 |
| 2006/0242072 A1* | 10/2006 | Peled | G06Q 30/02 705/51 |
| 2006/0259163 A1* | 11/2006 | Hsiung et al. | 700/30 |
| 2007/0040070 A1* | 2/2007 | Stevenson | B61L 29/30 246/122 R |
| 2007/0047527 A1* | 3/2007 | Croak | H04L 12/5695 370/356 |
| 2007/0070894 A1* | 3/2007 | Wang | H04W 72/1242 370/230 |
| 2007/0078533 A1* | 4/2007 | Caldwell | G05B 13/048 700/37 |
| 2007/0097868 A1* | 5/2007 | Bizzarri | H04L 41/5048 370/241 |
| 2007/0127423 A1* | 6/2007 | Ho | 370/338 |
| 2007/0142936 A1* | 6/2007 | Denison | G05B 19/4185 700/29 |
| 2007/0147346 A1* | 6/2007 | Gilmartin | 370/352 |
| 2007/0150081 A1* | 6/2007 | Nixon | G06T 13/00 700/83 |
| 2007/0168082 A1* | 7/2007 | Kim et al. | 700/245 |
| 2007/0177522 A1* | 8/2007 | Okitsu | H04L 41/082 370/252 |
| 2007/0179906 A1* | 8/2007 | Frankel | G06Q 20/00 705/75 |
| 2007/0192441 A1* | 8/2007 | Jin et al. | 709/219 |
| 2007/0220586 A1* | 9/2007 | Salazar | G06N 3/126 726/1 |
| 2007/0230498 A1* | 10/2007 | Fujiwara | H04B 3/542 370/442 |
| 2007/0239718 A1* | 10/2007 | Baxter | H04L 29/06027 |
| 2007/0268910 A1* | 11/2007 | Shen | H04L 69/40 370/395.21 |
| 2007/0293256 A1* | 12/2007 | Merched | H04L 27/2602 455/504 |
| 2008/0081579 A1* | 4/2008 | Chen | H04W 4/00 455/187.1 |
| 2008/0155075 A1* | 6/2008 | Cromer et al. | 709/222 |
| 2008/0208369 A1* | 8/2008 | Grgic | G06F 8/60 700/20 |
| 2008/0209211 A1* | 8/2008 | Grgic et al. | 713/166 |
| 2008/0228865 A1* | 9/2008 | Cruzada | 709/203 |
| 2008/0228957 A1* | 9/2008 | Meyer | G05B 19/0426 710/19 |
| 2008/0244216 A1* | 10/2008 | Zilavy | G06F 3/038 711/173 |
| 2008/0247549 A1* | 10/2008 | Blanc | B25J 9/1674 380/277 |
| 2008/0313242 A1* | 12/2008 | Doerr | G06F 11/2035 |
| 2009/0109865 A1* | 4/2009 | Seymour | H04L 41/147 370/252 |
| 2009/0132057 A1* | 5/2009 | Kettu et al. | 700/5 |
| 2009/0161550 A1* | 6/2009 | Savard | H04L 12/2838 370/241 |
| 2010/0114548 A1* | 5/2010 | Dheenathayalan | G05B 19/4185 703/13 |
| 2010/0179690 A1* | 7/2010 | Matthias | B25J 9/1676 700/253 |
| 2010/0308966 A1* | 12/2010 | Oki | G06Q 10/02 340/10.1 |
| 2012/0102172 A1* | 4/2012 | Rathod | 709/223 |
| 2012/0109719 A1* | 5/2012 | Parmar | G06Q 10/06375 705/7.37 |
| 2013/0030555 A1* | 1/2013 | Starr | G05B 23/0216 700/83 |

(56) References Cited

U.S. PATENT DOCUMENTS

| | | | | |
|---|---|---|---|---|
| 2014/0140213 | A1* | 5/2014 | Raleigh et al. | 370/235 |
| 2014/0214183 | A1* | 7/2014 | Mast | G05B 23/0235 |
| | | | | 700/32 |

FOREIGN PATENT DOCUMENTS

| | | |
|---|---|---|
| WO | WO 01/65422 A2 | 9/2001 |
| WO | WO 01/95100 A1 | 12/2001 |
| WO | WO 03/007092 A2 | 1/2003 |
| WO | WO 2004/027608 A2 | 4/2004 |

OTHER PUBLICATIONS

Mendes et al, "Service-Oriented Control Architecture for Reconfigurable Production Systems", IEEE, Jul. 2008, pp. 744-749.*

Federal Register, "Federal Register/vol. 76, No. 27/Wednesday, Feb. g, 2011/Notices", 2011, pp. 7162-7175.*

Schmid et al, "A Framework for Autonomic Performance Management of Virtual Machine-Based Services", Jun. 25, 2008, pp. 12.*

Schwaderer, "Execution partitioning for embedded systems increases security, reliability" 2006, pp. 2.*

Krsul et al, "VMPlants: Providing and Managing Virtual Machine Execution Environments for Grid Computing", 2004, pp. 12.*

Calvo et al, "A methodology based on distributed object-oriented technologies for providing remote access to industrial plants", Jul. 14, 2005, pp. 975-990.*

Kamio et al, "Providing Remote Plant Maintenance Support through a Service Virtual Enterprise", 2003, pp. 9.*

Jammes et al, "Service-Oriented Paradigms in Industrial Automation", Feb. 2005, pp. 62-70.*

Webopedia, "definiton: virtualization", 2014, pp. 1.*

ABB, "ABB Remote Diagnostic Services", 2006, https://library.e.abb.com/public/544f709af34955be852571940055f36e/ABB%20RDS%20Node%20Survey%20R2.pdf, pp. 2.*

Hartel et al, "Virtual Organization of After-Sales Service in the One-of-a-Kind Industry ", 2002, Springer, pp. 405-420.*

Delsing et al, "Migration of Industrial Process Control Systems into Service Oriented Architecture", 2012, pp. 5786-5792. downloaded from the internet https://ieeexplore.ieee.org/stamp/stamp.jsp?tp=&arnumber=6389039 (Year: 2012).*

Wikipedia, "Distributed control system", Sep. 2020, pp. 10. downloaded from the internet https://en.wikipedia.org/wiki/Distributed_control_system (Year: 2020).*

International Search Report (PCT/ISA/210) dated Jan. 11, 2010, by IB Patent Office as the International Searching Authority for International Application No. PCT/IB2008/003268.

"Industrial Control System," downloaded from https://en.wikipedia.org/wiki/Industrial_control_system on May 2, 2019, 6 pages.

"Guide to Industrial Control Systems (ICS) Security," NIST Special Publication 800-82, Revision 2, May 2015, 247 pages.

Baasel, Excerpt from "Preliminary Chemical Engineering Plant Design," Second Edition, 1990, 6 pages.

Seborg, "Automation and Control of Chemical and Petrochemical Plants," from Control Systems, Robotics, and Automation, vol. XIX, Oct. 2009, 12 pages.

Ender, "Regulatory Control is the Foundation for Advanced Process Control," Feb. 1, 2001, downloaded from https://www.controleng.com/articles/regulatory-control-is-the-foundationfor-advanced-process-control/ on May 2, 2019, 11 pages.

Bhanot, Excerpt from "Process Control Principles and Applications", Oxford University Press, Oct. 17, 2007, 20 pages.

Cahill, "Making Advanced Process Control Practical," Jan. 4, 2013, downloaded from https://www.emersonautomationexperts.com/2013/industry/oil-gas/making-advanced-process-control-practical/ on May 2, 2019, 3 pages.

* cited by examiner

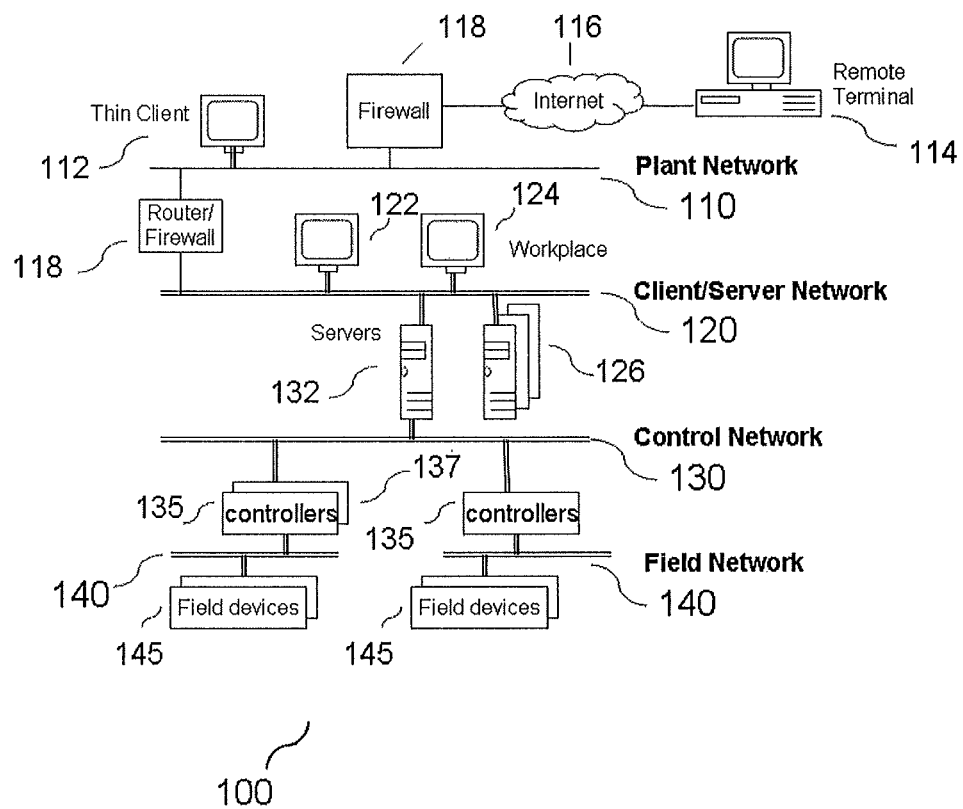
Figure 1: Prior-Art Distributed Control System

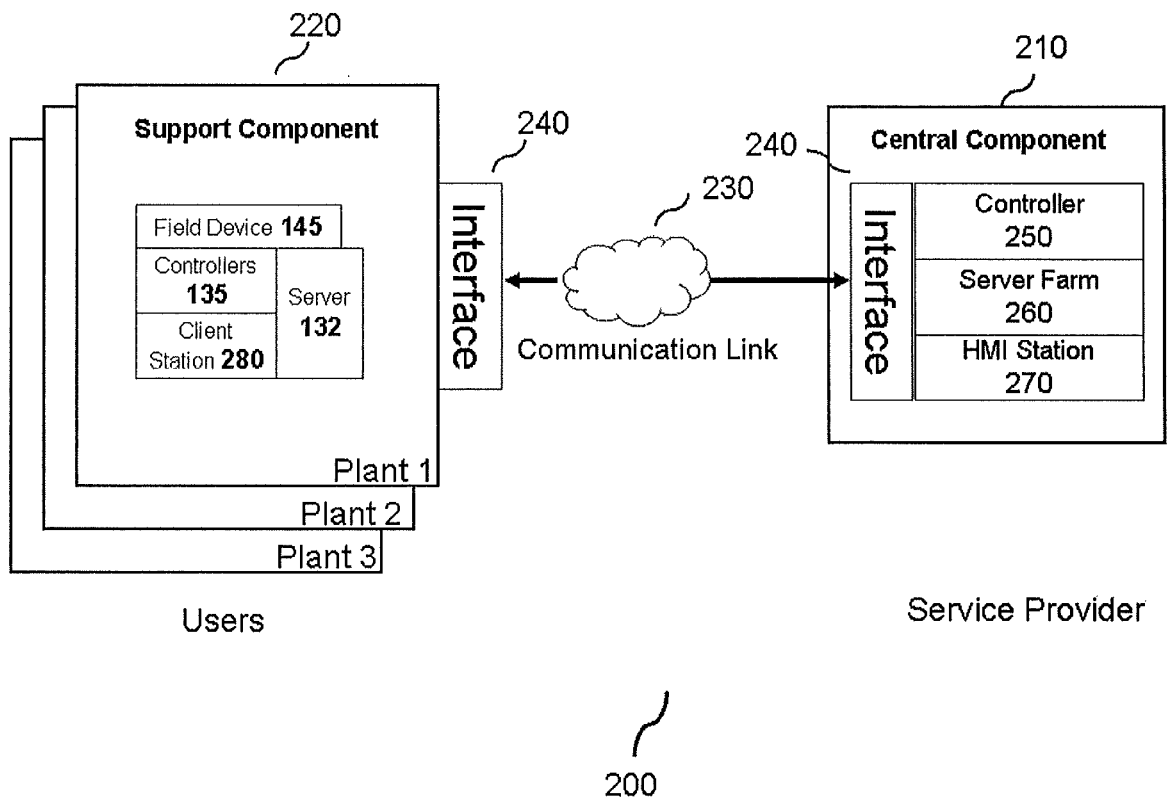
Figure 2: System for control and automation service (according to the main embodiment of the present invention)

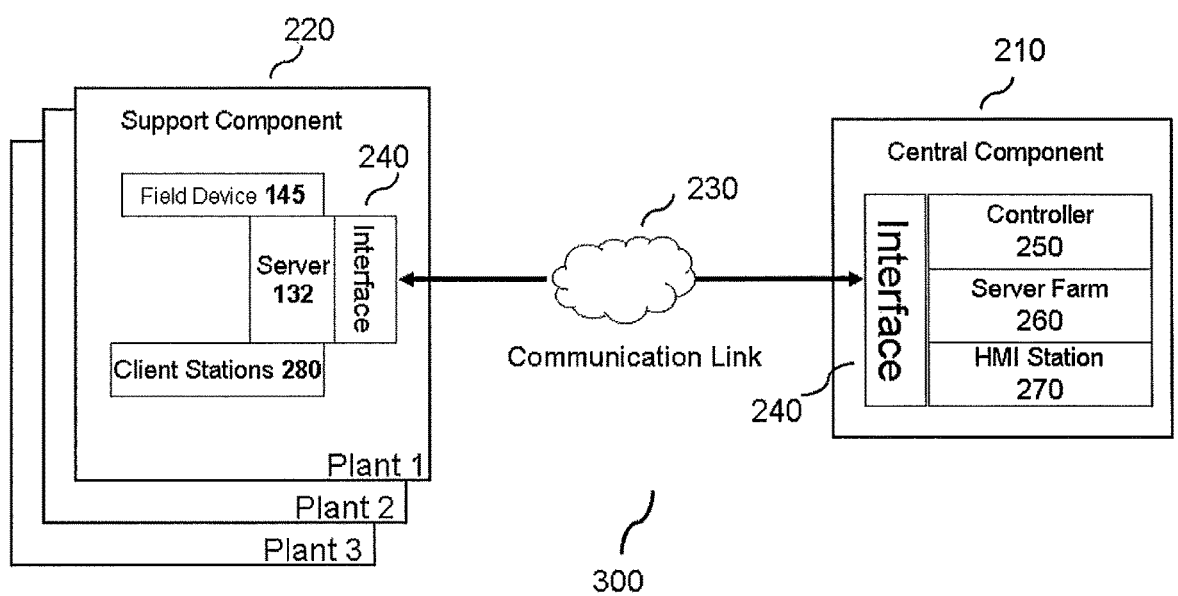
Figure 3: System for control and automation service for small sized plants

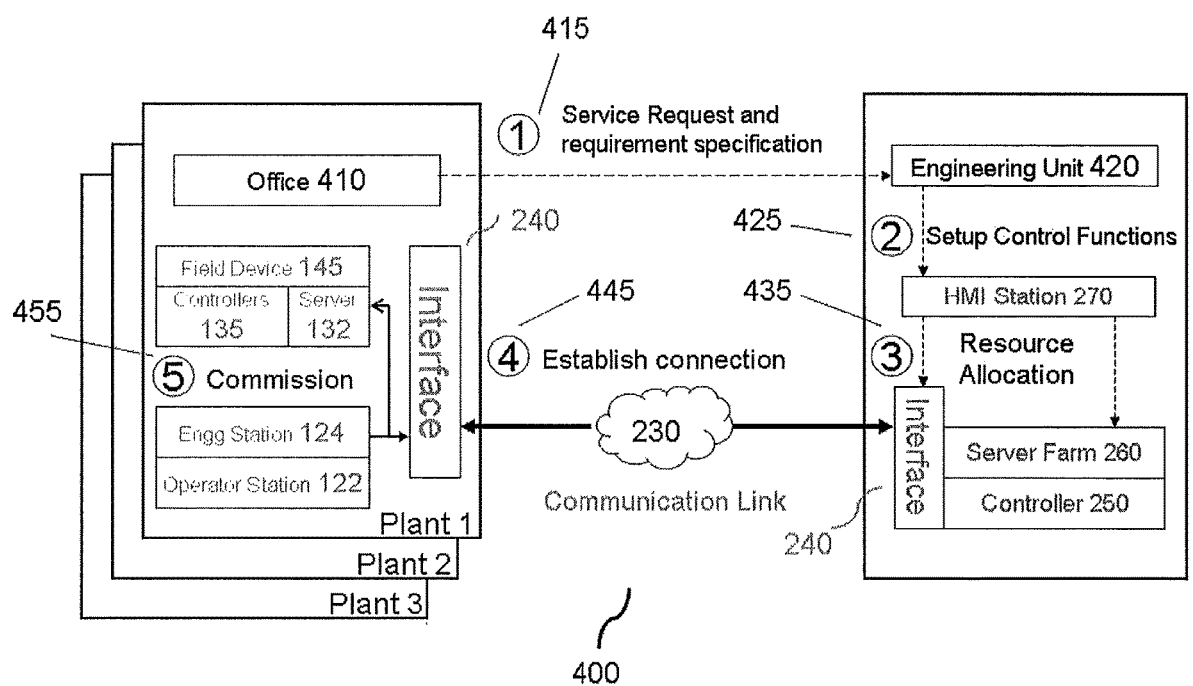
Figure 4: Method for provisioning control and automation services

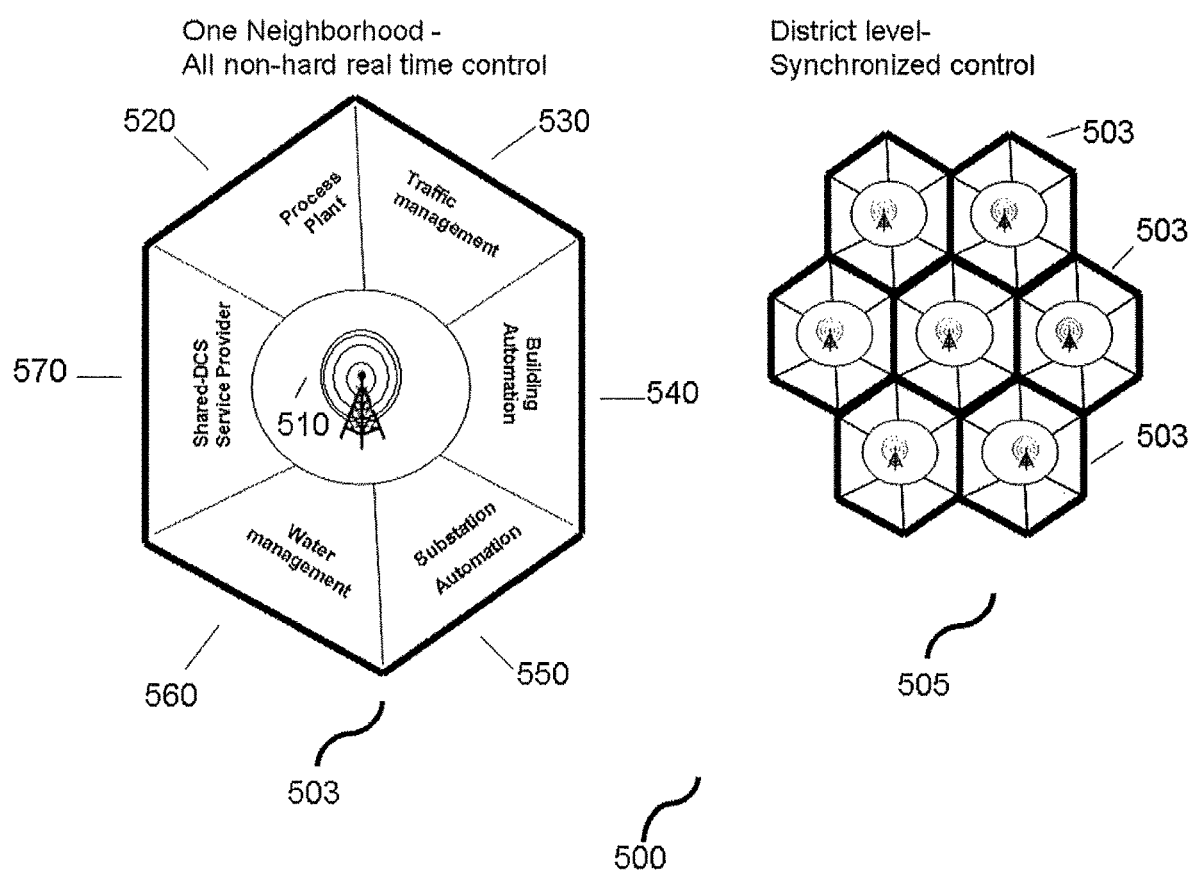
Figure 5: System for control and automation service using cellular communications

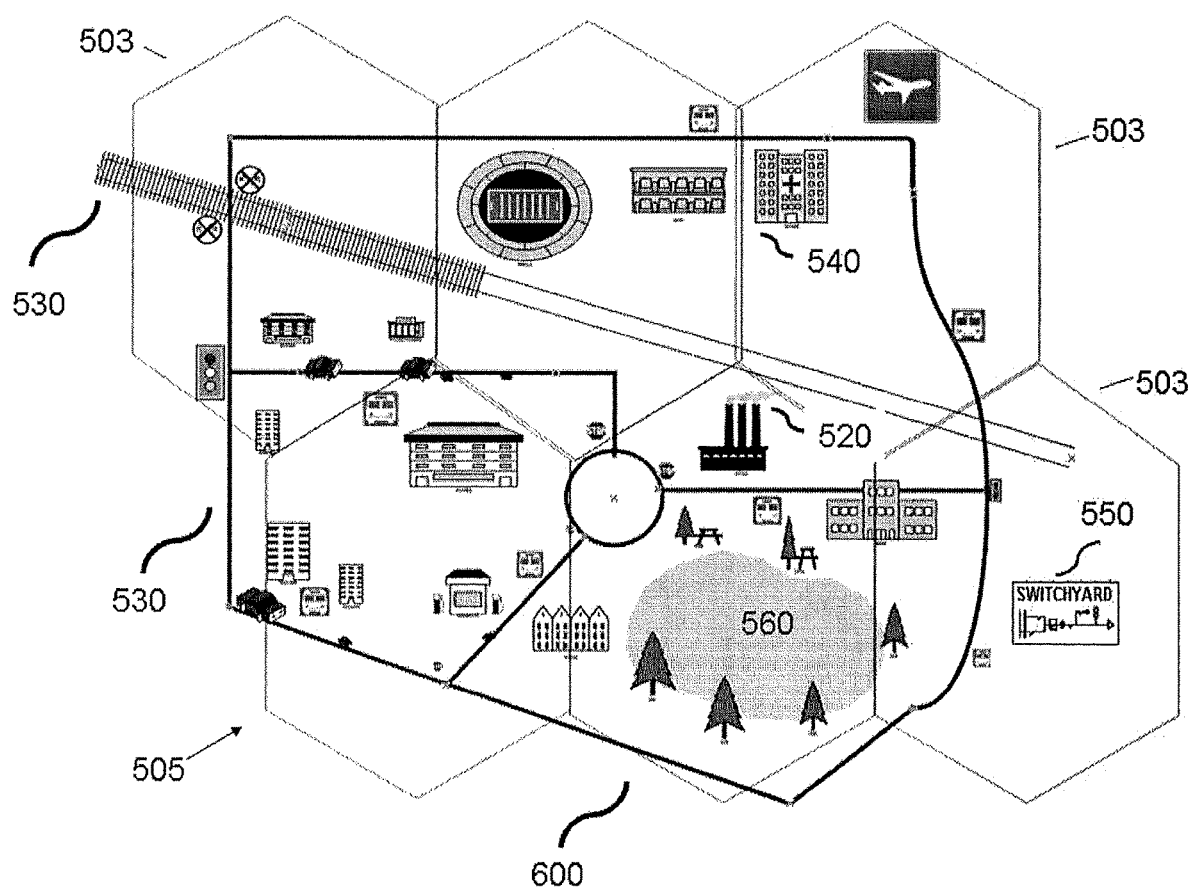
Figure 6: Application of control service for a township

SYSTEM AND A METHOD FOR CONTROL AND AUTOMATION SERVICE

RELATED APPLICATION

This application claims priority as a continuation application under 35 U.S.C. § 120 to PCT/IB2008/003268 filed as an International Application on Nov. 24, 2008 designating the U.S., the entire content of which is hereby incorporated by reference in its entirety

FIELD

The present disclosure relates to a system for providing control and expert services over a communication network by specialized service providers to various kinds of automation needs and methods thereof.

BACKGROUND INFORMATION

A process industry can address its plant control and automation needs through use of a Distributed Control System (DCS). A DCS may be visualized as a set of distributed programmable controllers deployed for process control using field devices for sensing and actuating to realize control operations. The DCS system utilizes servers and work-stations to support operations and management.

DCS systems have been deployed for plant automation of medium to large sized process industries. For small size industries or factory automation needs, Programmable Logic Controller (PLC) based systems have been used. PLC and DCS systems possibly could be differentiated based on the capabilities to handle large and complex control requirements for process control.

Another kind of system is Supervisory Control and Data Acquisition (SCADA) that is deployed for very large and distributed plant systems. SCADA functions to mainly monitor independent activities and co-ordinate them by exercise of supervisory or programmed control functions. A SCADA system is centralized in its function for monitoring process parameters and deploying control strategy having large dependence on controllers/switches local to the plant to receive a set point or trip conditions for control function. It is to be noted that SCADA systems rely on local controllers or devices to carry out control functions.

FIG. 1 shows a prior art Distributed Control System 100. The DCS system 100 may be visualized as having multiple layers of networks. The top layer is the plant enterprise network, also referred as plant network 110 that hosts thin clients 112 and remote clients 114 that communicate with the system over the Internet 116 through appropriate security measures constructed with routers and firewalls 118 to access information about the process plant. The next layer is the client/server network 120 having at least one server 132 that is a bridge to a distributed first controller 135 connected in a control network 130. Multiple additional servers 126 may also be connected to the client/server network 120 for specialized services for information and asset management. Configuration of the plant, monitoring and control operations are carried out through workstations for operators 122 and engineers 124 connected to this network 120.

The DCS system 100 also provides for a redundant controller 137 together with a first controller 135 for any designated critical functions. The redundant setup has capability to actively take over control functions from one controller to the other during failure of one of the controllers. The first controller 135 is connected to multiple field devices 145 in the field bus network 140 either directly or through input and output (10) devices, not shown in the figure. The field devices 145 include basic devices such as sensors, transmitters and actuators (not shown in the figure).

The architectures with multiple network layers are designed to effectively handle process information and command information from the control system. The layer containing the field devices is regarded as the basic layer having process (raw) data information and with each layer above the information may get abstracted. A PLC system would operate at the basic layer and the SCADA system would operate at higher layers (above the client/server network layer or plant enterprise network layer).

A high end DCS system has capability to integrate with PLC or SCADA systems and also cater to automation needs of a variety of process industries. At various levels, variety of functionality, protocols and tools can be integrated to seamlessly configure and connect to numerous devices and functionality specific for an enterprise. Some examples are advance control and optimization solutions, planning and scheduling of production including the maintenance activities, inventory management, purchase and finance management etc.

The various enhancements and integrations over decades developed with a concept "one system for all devices, industry and functionality" have increased the complexity of systems and operations. The complexity of the system mandates the plant personnel to focus beyond their primary goal of carrying out their production. Computer savvy and highly skilled operators and engineers are employed to configure and maintain the sophisticated automation system. This complexity also limits full utilization and penetration of a control system product to all segments of automation market.

Therefore, the present inventors have recognized it would be desirable to have a system that can simplify control and automation for the plant personnel and at the same time retain all the rich features of the advanced DCS. It would also be desirable that the simplicity and rich features are provided in a most cost effective manner to enable plant personnel to make a head start with production with minimal capital and operational cost. This aspect can be relevant particularly to small and medium sized process industries.

SUMMARY

A system having elements of an automated control system is disclosed for industrial control and automation services for one or more industrial plants, the system comprising: at least one central component which includes at least one of a controller, a server, and a Human Machine Interaction (HMI) station; at least one dedicated communication link for connecting a user support component with the central component; at least one interface for associating the central component and the support component, the interface including at least one of a communication component, and a security and management component for configuring, providing, receiving, monitoring and maintaining the control and automation services; and at least one user support component which includes at least one of a field device, a controller, a server and a client station.

A method is also disclosed for providing control and automation services by a system having elements of an automated control system for industrial control and automation services for one or more industrial plants, the method comprising: engineering control devices and functions for a central component and a support component; allocating resources in the central component by configuring a server and an interface; establishing communication for the control and automation services through and/or by the interface; and commissioning a plant for the control and automation service from the central component.

BRIEF DESCRIPTION OF THE DRAWINGS

Systems and methods of varying scope are described herein. In addition to the aspects and advantages described herein, further aspects and advantages will become apparent by reference to the drawings.

It is to be noted, however, that the appended drawings illustrate only exemplary embodiments of this disclosure, and are therefore not to be considered for limiting its scope, for the disclosure encompasses other equally effective embodiments in the drawings:

FIG. 1 illustrates a prior art DCS system architecture;

FIG. 2 illustrates a system for control and automation service according to an exemplary embodiment of the present disclosure;

FIG. 3 illustrates an exemplary system for control and automation service for small sized plants;

FIG. 4 illustrates an exemplary method for provisioning control and automation services;

FIG. 5 illustrates an exemplary system for control and automation service with cellular communication network; and FIG. 6 illustrates an exemplary application for control service for a township.

DETAILED DESCRIPTION

Exemplary embodiments of the present disclosure provide a system for control and automation functions having greater flexibility and simplicity to the plant users.

An exemplary control system as disclosed herein can enable a user to run operations with reduced capital investments for automation systems and operational overheads associated with configurations, expansion, maintenance and training.

An exemplary system for control and automation functions can be hosted by specialized service providers.

Methods are also disclosed to deliver the control and automation services to the users.

An exemplary system for control and automation can extend to needs in a township.

Accordingly, exemplary embodiments of the present disclosure relate to systems and methods to provide control and automation services that, by a combination of technical and service solutions, are able to position a powerful and feature rich automated control systems such as Distributed Control System (DCS), Programmable Logic Controller (PLC), Supervisory Control And Data Acquisition (SCADA) for a variety of automation and control needs and thereby increase utilization of the automated control system.

In a first exemplary aspect of the present disclosure, the system for control and automation is described as comprising:
(a) at least one central component to provide a service to one or more users;
(b) one or more dedicated communication links for connecting the one or more users and the said central component; and
(c) one or more interfaces to enable the service to one or more users;

wherein the central component includes one or more devices such as a controller, server, Human Machine Interaction (HMI) station, and wherein the one or more interface comprises components such as communication, security and management components for configuring, providing, receiving, monitoring and maintaining the control and automation services.

In an exemplary embodiment of the present disclosure, a system for control and automation is deployed to enable use of automated control system such as distributed control system (DCS), Programmable Logic Controller (PLC), Supervisory Control And Data Acquisition (SCADA) for one or more users comprising:
a) a service provider to facilitate the control and automation service with the central component and one or more interfaces for the user;
b) a user support component to avail one or more control and automation services;
wherein the support component includes (e.g., consists of) one or more devices such as field devices, controllers, servers and client stations.

In another exemplary embodiment of the present disclosure, the system for providing control and automation service is used for services such as control service, automation service, monitoring service, backup or protection and safety services or other services alike.

In yet another exemplary embodiment, the one or more interface of the system providing control and automation service can be an integral part of the central component with the service provider or can be an integral part of the support component with the user or can be an integral part of both the central component and the support component.

In yet another exemplary embodiment, the control and automation service can be provided by one of the one or more users and the central component can be with the one or more user.

In still another exemplary embodiment, the one or more devices in the central component or one or more functions of the central component or the combination of devices and functions of the central component can be provided using software, firmware or hardware based solutions including virtualization to cater the various specifications of the user, and the one or more devices in the support component or functions of the support component or the combination of devices and functions of the support component can be provided using software, firmware or hardware based solutions including virtualization to receive the various services from the service provider.

In still another exemplary embodiment, the communication link is provided by one or more communication network service providers and these one or more communication network service providers collaborate to assure quality of communication service, and the communication link can be provisioned by means of either wired or wireless communication networks including cellular networks or in combination of wired and wireless communication networks.

In still another exemplary embodiment, a system for providing control and automation services can have at least two central components provisioned for one user and wherein the central components are provisioned by one or more service providers and these one or more service providers collaborate to assure quality of control and automation services.

In still another exemplary embodiment, the central component of the system for providing control and automation service can have at least one control function or a controller for a user.

In a second exemplary aspect of the disclosure, a method for configuring a system for control and automation services is provided. The method comprises:
(a) receiving requirements for the control and automation service from a user;
(b) engineering control devices and functions for a central component and a support component;
(c) allocating resources in the central component by configuring a server and an interface;
(d) establishing a communication link for the control and automation services through the interface; and
(e) commissioning a plant in the user site for the control and automation service from the service provider.

In a third exemplary aspect of the disclosure, an interface used in a control and automation service system comprises:
a) means to establish communication link; and
b) means to coordinate activities related to information, data transfer and management of devices or functions associated with a central component or a support component.

In a fourth exemplary aspect of the disclosure, a central component of a control and automation service system is described to comprise:
a) means to communicate with a user through a communication link; and
b) means to provide a service to the user.

In a fifth exemplary aspect of the disclosure, a support component of a control and automation service system comprises:
a) means to acquire data related to one or more parameters that is required for observation or manipulation through a service such as monitoring, control, automation, backup, protection or management service; and
b) means to communicate with a central component to receive the service related to the one or more parameters.

In the present disclosure, an exemplary system for control and automation is provided by a combination of technical and service perspective for users with, for example, an intention of being able to position a powerful and feature rich control system such as DCS for a variety of automation markets and thereby increase utilization. The solution is provided by enabling sharing of a powerful and feature rich control system among more than one organization.

FIG. 2 shows the system 200 according to an exemplary embodiment of the disclosure for providing control and automation services. The system 200 presents a novel, complete re-arrangement of the FIG. 1 DCS architecture in such a way that it can offer significant control and automation service potential to users. The system 200 for control and automation has a service provider (SP) organization to provide control and automation service. One or more SPs can cater to the control and automation needs of industries in a given neighborhood and absolve users from the task of procuring, provisioning and maintaining systems for control and automation.

The system 200 for control and automation services comprises a central component 210, owned by the service provider to provide control and automation services to one or more users who have support component 220. The service is offered through use of dedicated communication links 230 via the Internet or other private networks for connecting the support component 220 of users to the central component 210. The dedicated communication link 230 is deployed through a suitable network topology such as a ring network, star network, backbone bus network or hybrids thereof to achieve efficient and cost effective communication. In addition, suitable interfaces 240 are used along with the central component and the support component to enable services to the users. The interface 240 with the service provider may be an integral part of the central component with the service provider. The interface may be present in either an explicit form such as a hardware or embedded device or in an implicit form such as software or a firmware.

The central component 210 can include one or more devices such as controller 250 for regulatory, supervisory or programmable logic control, server 260 and Human Machine Interface (HMI) station 270 including (e.g., consisting of) either engineering stations or monitoring stations or both.

The server 260 may include a server farm to provision scalable and quality services to the users. In addition the server or the server farm can be capable of being configured for one or many instances of virtualized regulatory or supervisory controller functions for the remote plant and also can be capable of being configured for one or multiple instances of virtualized advanced functions such as advanced control and optimization, planning and scheduling services, enterprise information and management services. In all, the server farm could run one or multiple instances of DCS functions.

An exemplary interface 240 can include communication interfaces such as multiplexers/adaptors, means and devices for wired and wireless communication including Cellular or Ethernet based devices as desired or specified to establish the communication link 230. In addition, the interface can also have provision at each site to ensure security of information operations. The interface can provide confidentiality, integrity and availability functions to the networks it protects with components such as firewalls, intrusion detection systems, authentication servers and key servers.

The server 132 can be deployed to host services specified (e.g., required) for local control configuration, operation and monitoring through various client stations 122, 124. Some of the components used for providing communication and application security can also be hosted by the local server 132.

The one or more users have the support component including (e.g., consisting of) field devices 145 in close proximity to the process equipment (not shown in the figure) as these can be an integral part of the plant function at the plant site. The plant site is also referred to as a user site in the present disclosure. For designated (e.g., critical) plant processes, the users can have local controllers 135 and client stations 280. The client stations 280 may include (e.g., consist of) functionality of known engineering stations 124 and operator stations 122 to carry out operations related to the plant. The interface 240 at the user site can be provided by the service provider. The interface 240 at the user site may be a preconfigured device or a software solution loaded in the server 132 or other components at the user site.

The provision of service by the SP can be enabled through, for example, an agreement such as a service agreement and confidentiality agreement with the plant user to deal with for example, services that involve a need to view the process data or any pre-configured specific data or events such as alarm conditions from the plant for provisioning expert or value added services. The interface 240 in the central component 210 may also be suitably configured for information security to enable provisioning of expert or value added services. Other users of the central components can be barred from the view of process data through security configuration at the interface 240 at the user site. However, it is to be noted that security configuration does allow sharing of information among multiple users on advice from all the collaborating users.

FIG. 3 shows a minimal configuration of an exemplary support component to receive control and automation service suitable for a small sized plant. In an exemplary embodiment, the small sized plant user need to only host field devices 145, a local server 132 and client stations 280 for plant operation.

The SP can operate in a contractual fashion to provide control services to the user organizations. The responsibility for managing the control services and the infrastructure can, for example, rest with the SP. The provisioning of services can involve multiple steps described in FIG. 4. The initiation for the service can be done by the user organization office 410 by a service request as the first step 415. The user provides desired specifications to the SP. The request and specification may be provided as a document, via use of a web portal or via any other information exchange system including voice based systems. The SP may also host a means, such as a dedicated processor or a software module which configures a processor, to estimate performance of control loops through the communication link 230 to help the user choose the right kind of the service for their specifications and/or requirements. The performance estimates can be based on parameters such as control loop specifications/requirements, communication quality of service (reliability, latency), computational specifications/requirements (computer power, memory) and/or cost (budget). The means for providing performance estimates may also be a look up table stored in a memory, a dedicated software or hardware, tool or control service simulation method stored in memory.

The specifications and/or requirements are received by the engineering unit 420 with the SP. As the second step 425, the control functions are engineered. The engineering activity includes activities for the central component 210 and also the activities to be carried out at the user site for the support component 220. These activities may be carried out in automated, preconfigured or manual manners. Examples of engineering activities include design of configurations and their installation for IO and signal handling, system partitioning, control loops and device libraries, HMI and administrations of server or control system components.

As the third step 435, the server and the interface are configured and resources are allocated to cater to the specifications/requirements of a specific user. The configuration can include settings to satisfy communication Quality of Service (QoS) and application security desired to keep the information confidential and integral to the user who owns the information. Another set of configurations for information security is provided in the interface 240 and the server 132 at the user site to define role based access of information and control to configure specific control specifications and/or requirements for the plant. As many controllers 250 as are to be involved can be configured in the central components. As mentioned earlier, these controllers may be used for regulatory, supervisory or logic based automation needs. In addition, the controllers may be soft virtualized controllers in the server farm or a hardware device including embedded systems or other forms of microprocessor based systems with firmware or software based solutions to cater to control and automation needs of users.

As a fourth step 445, a communication link for control service is established between the central component 210 with the service provider and the support components 220 at the user site. This step relates to activities that enables the interface 240 with the service provider to communicate (e.g., receive and send data) with the interface 240 at the user site and provide configuration of security needs for secure communication. The communication link may be an Ethernet based link supporting multiple protocols such as EoMPLS or of other forms that support large data transfers. The quality of the service (QoS) aspects can be governed by a contract between the service provider for control and automation service and the communication network service provider for communication and network service and can be managed by the service provider for control and automation service. On some occasions, the communication network service provider may also extend service to provide services for control and automation to end users and in that case the communication network service provider can take the role of control and automation service provider.

On establishing the communication link the SP, the support component 220 at the user site can be configured through automated or manual means, such as a designated software module or processor and/or keyboard, including the use of a preconfigured solution and commissioning activity 455 initiated along with the user. The configuration activity can include engineering activities involved in configuring the local controllers 135 and server 132 present with the user, having the IO's linked appropriately with the local controllers and the remote controller 250 in the central component 210 with the service provider. A large number of pre-configured solutions from the engineering step 425 may be used for configuration at the user end. Acceptance tests can be carried out with the user and on successful completion of the test the user plant can be declared commissioned.

The service provider may provide multiple expert services such as optimization solutions, consultation to the plant user on matters related to the performance and management of the plant etc as a value add service in addition to the control and automation service. The service provider can maintain the resources and configurations involved in carrying out the control services as per any contract with the user for the contract period. The arrangement may be based on a subscription model. An accounting feature may be included in the interface 240 with the service provider to keep account of the subscription.

The system 200 allows for a variety of arrangements, such as multiple users may utilize the central component 210 with the service provider to coordinate their activities. Also, as discussed earlier, various service providers of the central component 210 and the communication service providers may collaborate in a variety of manners to ensure quality of service. It is to be noted that a user could also play the role of the service provider. Also, the central component 210 may be located in one of the user site.

Further, the one or more central components 210 can be flexible to be used for either control and automation service, or just the control or automation service or even monitoring or as a backup system for another central component. The one or more central components 210 may also be used as an additional protection component to improve reliability and safety to the system with the user. The configurations for the interface and the communication link can be suitably configured to achieve the various functions for the users, another central component with the one or more service provider.

In addition, it is to be noted that the system 200 can be easily extendable outside process industries to a variety of automation needs arising in day to day functions. The processes related to these functions or activities may be regarded as belonging to a community or township. These processes can serve to systematically and effectively utilize the common resources of a community (like water, roads, transportation, electricity, etc.). The system for control and automation service described in this disclosure can be ideal for this environment to provide non-critical control operations involved in a township to provide unified, standardized services. In the township setting, the one or more users of the central component 210 provided by the service provider can be formed from process industries in a geographical area within the township, the government and regulatory bodies, individuals, public or private companies, organizations, associations or institutions.

Accordingly, as another exemplary embodiment, the present disclosure provides for boundary-less township development through automation of systems that form the core of any township. Such an application beyond the bounds of the process industry users can result in enhancement of value for the investment for the system to provide control and automation service.

The application of the control and automation service to a township can involve consideration from the communication system point of view. A wired communication system may have certain limitations when considering reach of services and cost of deployment. Wireless networks can provide ease of deployment and cost reduction to get the devices connected to the network since there is no wiring involved. Also, due to the shared infrastructure such as the cell tower, wireless cellular networks can provide high bandwidth communications at the field device level and hence enhance the utilization of the plant by providing a scalable and easily maintainable field network.

FIG. 5 shows exemplary system 500 for control and automation service applied to the automation needs of a township through the use of broadband cellular networks for various neighborhoods in a township. The service in a neighborhood is depicted through a single cell illustration 503 for various automation needs such as, but not limited to, process plants 520, traffic management 530, building automation 540, substation automations 550 and water management 560. These automation services are provided by the township service provider 570 through, for example, use of broadband cellular network 510 in the cell 503 whose definition is bounded by the coverage of the cellular network 510 in use.

As an extension, one or more cells 503 may function independently or in collaboration to provide services to a larger neighborhood or for multiple neighborhoods in a township setting. One such arrangement of multiple cells of 503 is provisioned to extend coverage to a township 505. The cells in a township may have more than one service provider and have capabilities for inter-networking. Inter-networking enables service providers across cells to communicate to provide value added services. The cells in a township 505 may also be arranged in partial or complete overlapping manner to increase reliability of the communication in a particular neighborhood.

FIG. 6 maps an exemplary scheme described with multiple cells 505 for a control and automation scheme for a township 600. It is to be noted that in a township setting various supervisory control and data acquisition (SCADA) functions can be carried out as well to integrate or provide cross functional value add services. The function in a township is explained through use of application examples.

In an exemplary application, the traffic management 530 of a township can be coordinated based on traffic flow to ensure efficient utilization of the road system. The traffic management 530 is not limited to just the road system and is applicable in general to any transport system. The traffic management system 530 may also be used in combined manner. For example the traffic management for road system may also be applied in combination with the traffic management for the train system to automatically control traffic at railway crossings through monitoring of train locations to provide added safety to the citizens.

In another exemplary application, the integrated approach can enable law enforcement support functions. For example, with traffic management system 530, functions such as vehicle identification, traffic violations monitoring, patrol officer safety systems, etc. would support law enforcement for traffic patrol.

The automation needs in a township 600 that fall under the categories listed are exemplified by commercial and residential community infrastructures such as street lighting, air-conditioning, building lighting, water treatment, backup power systems, traffic lights, law enforcement systems, etc.

The total cost of ownership of the automation system can be reduced significantly for the community while the benefits of automation are compounded by decreasing the workload of public works departments, increasing the utility of public funds and increasing quality of life for the citizenry.

It is also to be noted that the control and automation service offerings can cater to new as well as the existing control system users. Existing control system users can utilize the system for control and automation service to expand operations with reduced overhead.

New users can engage control and automation service by subscribing to the desired and/or necessary functions. Thus, the system for control and automation service provides a low cost solution for small and medium scale industries to use state-of-the-art control functions. In addition, the users have an avenue for easy transition from a multi-vendor legacy based control system environment to a service based control environment that has reduced constrains from the use and maintenance of legacy control systems. Various vendors and channel partners have an opportunity for faster introduction of enhancements to control functions.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A central component for providing control and automation services relating to a distributed control system (DCS) shared between a plurality of industrial process plants at a plurality of plant sites, the central component being remote from the plurality of plant sites and comprising:

a first interface for connecting, through a communication link, to a second interface of at least one support component at one of the plurality of plant sites to receive and send data between the first and second interfaces to enable the control and automation services;

a Human Machine Interface (HMI) station, servers, and controllers configurable as one or more virtualized regulatory controllers and a supervisory controller for providing the control and automation services to the industrial process plant; and one or more instances of the virtualized regulatory controllers configured in accordance with a requirement specification of a user of the one of the plurality of plant sites, wherein the one or more instances of virtualized regulatory controllers are for providing regulatory control to field devices at the plurality of industrial process plants;

wherein the first interface and the second interface are configured to provide a target communication quality of service determined based on a control loop simulation method stored in a memory.

2. The central component of claim 1, wherein the central component is additionally configured to provide non-critical control operation, and wherein the at least one virtualized controller of the central component is configured for programmable logic control (PLC), supervisory control and data acquisition (SCADA), or non-critical regulatory control.

3. The central component of claim 1, wherein the central component is further to provide control through the use of wireless networks.

4. A distributed control system comprising:
at least one of central component according to claim 1; and
at least one support component at each of the plurality of plant sites, wherein each at least one support component comprises:
a second interface for communication with the central component through the first interface,
a plurality of field devices,
client stations, and
local controllers for designated critical plant processes at the plant sites; and
a plurality of communication links for connecting the second interfaces of the support components at each of the plurality of plant sites with the first interface of the central component.

5. A method to commission and operate an industrial process plant at a plant site and for a service provider to provide control and automation services with a distributed control system (DCS), wherein the DCS comprises at least one support component, at least one central component, interfaces for the at least one support component and the at least one central component, and a communication link between the interfaces to enable a variety of control and automation services relating to at least one of the distributed control system, a programmable logic controller, and supervisory control and data acquisition, the method comprising:
(a) provisioning DCS components to operate a process plant at the plant site using:
the at least one support component at the plant site,
the at least one central component remote from the plant site,
the interfaces for the at least one support component and the at least one central component, and
the communication link between the interfaces to enable the control and automation services, wherein the interfaces comprise a first interface with the at least one central component and a second interface with the at least one support component at the plant site, wherein the at least one support component comprises a plurality of field devices, local controllers, and client stations, and wherein the at least one central component comprises a Human Machine Interface (HMI) station, servers, and controllers configurable as at least one virtualized regulatory controller and at least one supervisory controller for providing control and automation service to the industrial process plant;
(b) receiving a service request and requirement specification from a user of the plant site for control and automation service;
(c) engineering control functions for the at least one central component and for the at least one support component, wherein the engineering for the at least one central component includes allocating resources in the interfaces and the at least one central component and configuring one or more instances of virtualized regulatory controllers in the at least one central component based on the requirement specification;
(d) establishing the communication link for the control and automation service between the at least one central component and the at least one support component at the plant site by enabling communication between the first interface with the at least one central component and the second interface with the at least one support component, wherein the first interface and the second interface are configured to provide a target communication quality of service determined based on a control loop simulation method stored in a memory; and
(e) configuring, at the plant upon establishing the communication link, server and local controllers present with the at least one support component and having inputs and outputs (IO's) from the field devices linked with local controllers of the at least one support component and with the virtualized regulatory controllers of the at least one central component to commission and operate the industrial process plant at the plant site for the control and automation services, wherein the local controllers are provided for designated critical plant processes at the plant site, and wherein the configuring at the plant site includes use of the control functions pre-engineered for the at least one support component.

6. The method of claim 5, wherein the control and automation services are provided by a service provider.

7. The method of claim 5, wherein the control and automation services are provided by the user of the plant site.

8. The method of claim 5, wherein:
one or more devices of the at least one central component or one or more functions of the at least one central component, or a combination thereof, are provided using software, firmware, or hardware based solutions including virtualization to cater to various needs of the user of the plant site; and
one or more devices of the at least one support component or one or more functions of the at least one support component, or a combination thereof, are provided using software, firmware, or hardware based solutions including virtualization to receive the control and automation services from the at least one central component.

9. The method of claim 5, wherein the communication link is provided by one or more communication network service providers and these one or more communication network service providers collaborate to assure a communication quality of service, and wherein the communication link is provisioned by at least one of a wired communication network and a wireless communication network including a cellular network.

10. The method of claim 5, wherein the DCS has at least two central components provisioned for the industrial process plant and wherein the at least two central components are provisioned by at least two service providers who collaborate to assure quality of the control and automation services.

11. The method of claim 5, wherein the one or more instances of virtualized regulatory controllers of the at least one central component are configured for providing logic-based control and automation using programmable logic control.

12. The method of claim 5, further comprising operating a plurality of industrial process plants at a plurality of plant sites, each of the plurality of plant sites having at least one support component connected to the at least one central component.

13. The method of claim 5, wherein the provisioned interfaces include communication interfaces for establishing the communication link and providing confidentiality, integrity, and availability functions using at least one of firewalls, intrusion detection systems, authentication servers, and key servers.

14. The method of claim 5, wherein provisioning the DCS includes configuring the interface of the at least one central component to satisfy communication quality of service and application security for at least one of (i) keeping information confidential and integral to the user of the plant site, (ii) allowing sharing of information among multiple users on advice from collaborating users from the plurality of plant sites, and (iii) configuring viewing of process data or any pre-configured specific data or event from the industrial process plant for enabling expert or value added services.

15. The method of claim 5, wherein performing engineering at the plant site comprises configuring the interface of the at least one support component to define role based access of information and control to configure specific control specifications and requirements for the plant site.

16. The method of claim 5, wherein engineering control functions for the at least one central component and for the at least one support component includes design of configurations and their installations for input-output and signal handling, system partitioning, control loop, device libraries, human machine interface, and administrations of servers to meet requirements and to have preconfigured solutions to configure the local controllers of the at least one support component.

17. The method of claim 5, wherein the DCS has at least two central components provisioned to provide the control and automation services for the industrial process plant.

18. The method of claim 5, further comprising configuring the interfaces for communication and for coordinating activities related to information, data transfer, and management of devices or functions associated with the at least one central component or the at least one support component, wherein configuring the interfaces is performed according to the requirement specification of the user of the plant site.

19. A distributed control system comprising:
at least two central components according to claim 1; and
at least one support component at each of the plurality of plant sites, wherein each support component comprises a second interface for communication with each of the at least two central components through the first interface of each central component; and
a plurality of communication links for connecting the first and second interfaces to receive and send data between the first and second interfaces to enable the at least two central components to provide control and automation services to each of the plurality of plant sites.

* * * * *